March 28, 1939. L. E. LA BRIE 2,152,066
BRAKE
Filed Sept. 9, 1935 3 Sheets-Sheet 1
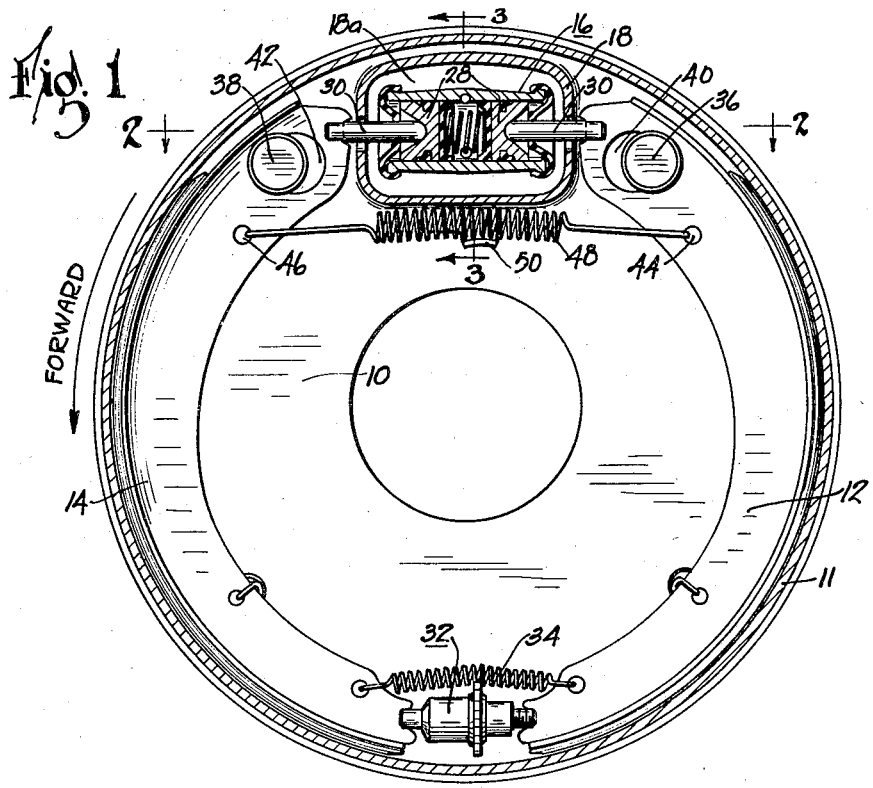
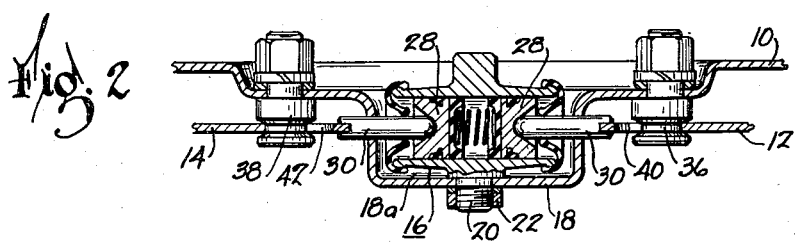
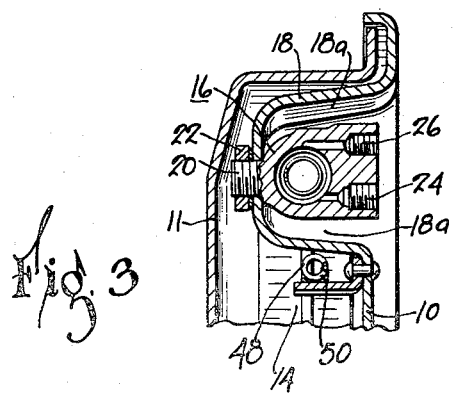
INVENTOR.
LUDGER E. LaBRIE
BY Jerome R. Cox
ATTORNEY.

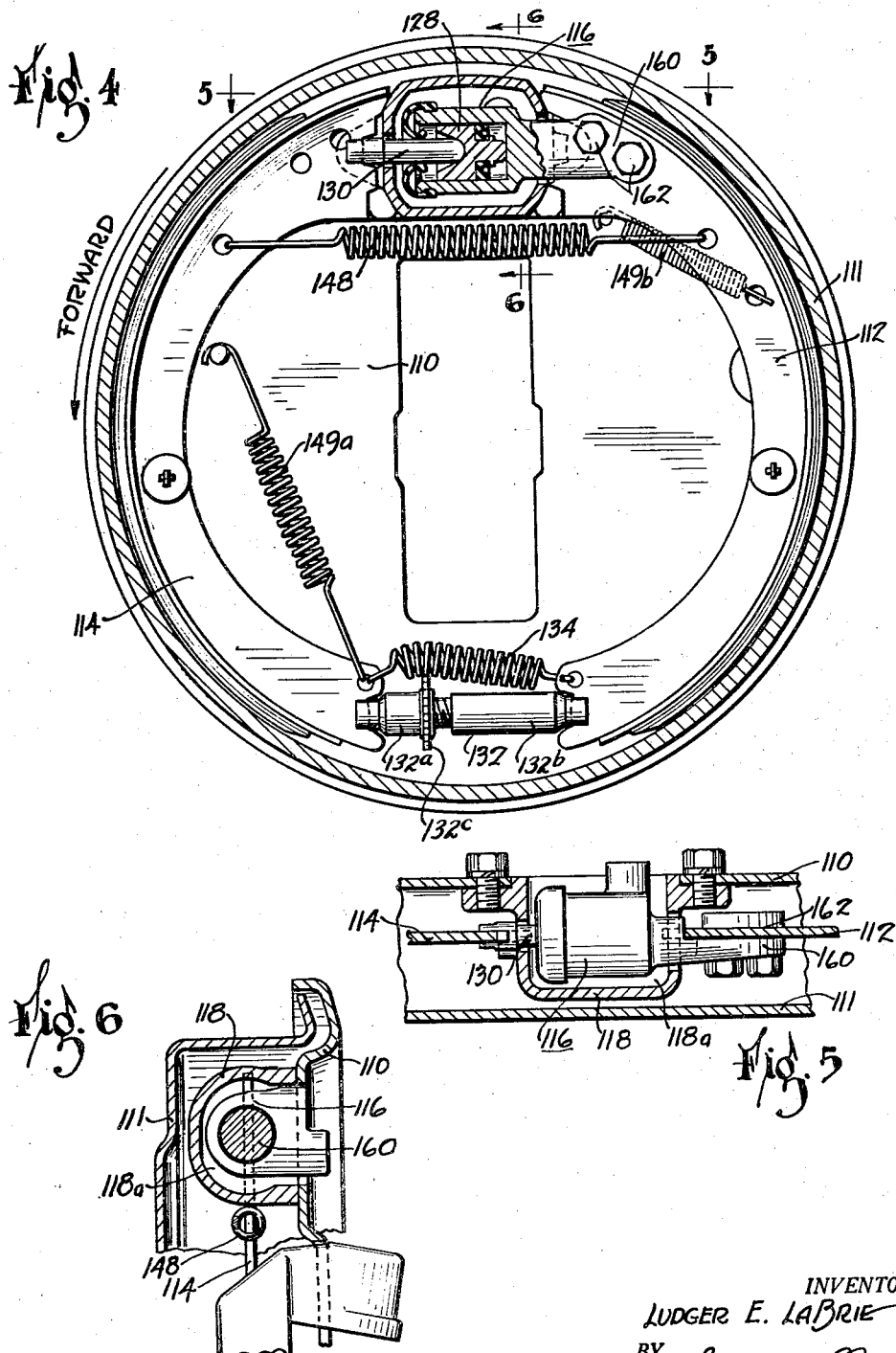

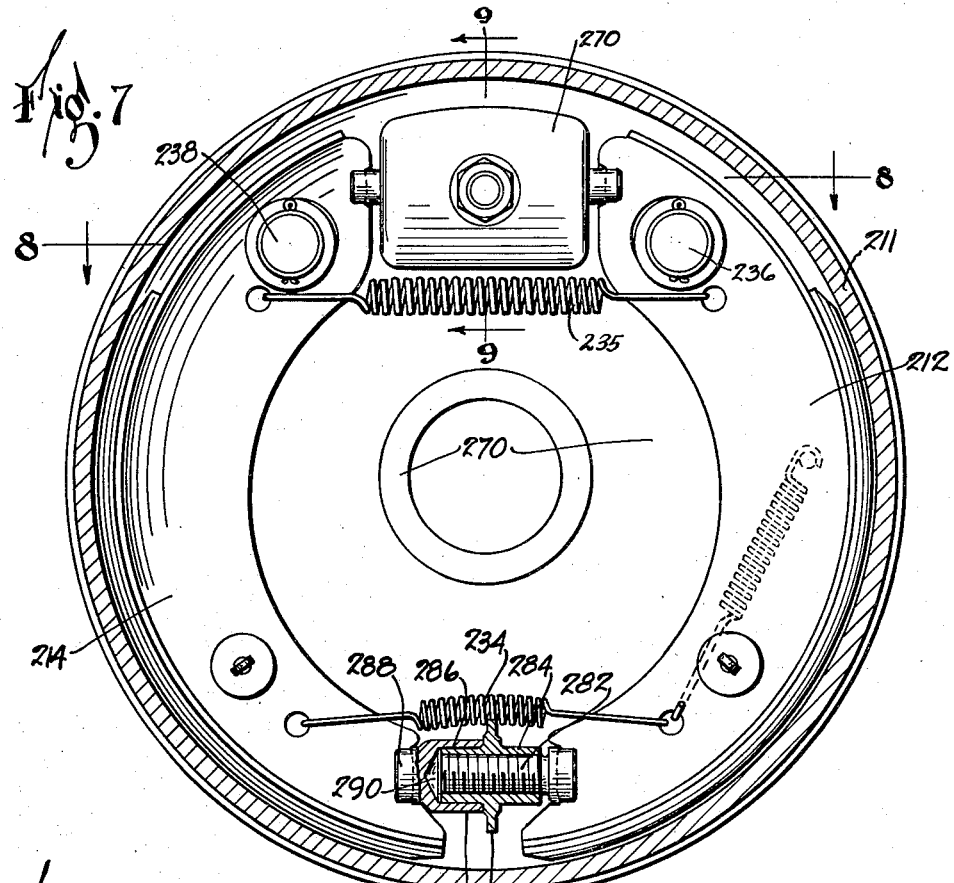
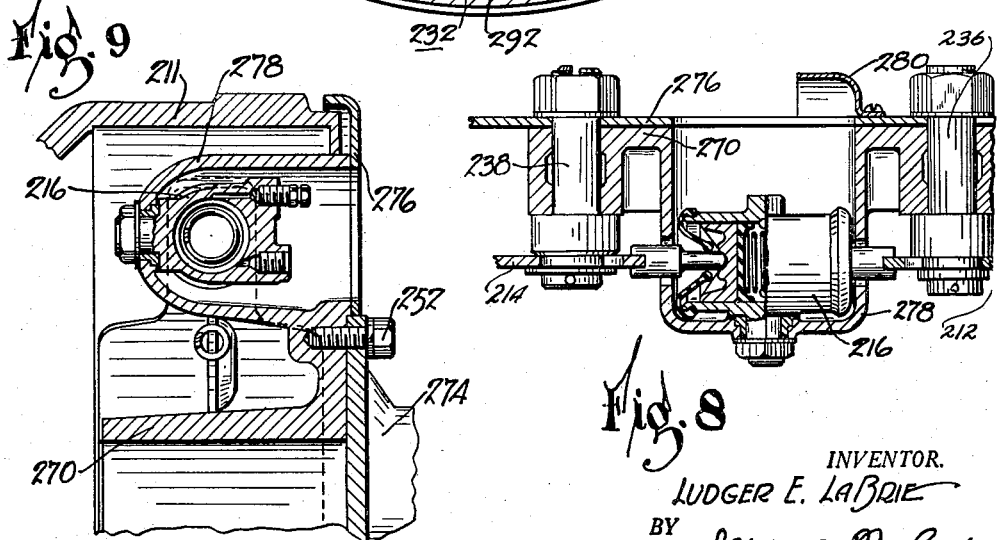

Patented Mar. 28, 1939

2,152,066

UNITED STATES PATENT OFFICE 2,152,066

BRAKE

Ludger E. La Brie, South Bend, Ind., assignor to Bendix Products Corporation, South Bend, Ind., a corporation of Indiana Application September 9, 1935, Serial No. 39,736

4 Claims. (Cl. 188—152)

This invention relates to brakes and is illustrated by several embodiments of hydraulically actuated internal expanding brakes of the duo-servo type.

One of the objects of the invention is the provision of a hydraulically actuated brake suitable for trucks or other heavy duty automobiles.

A further object of the invention is the provision of means for cooling the hydraulic brake actuating cylinder while in use.

One feature of the invention is the provision of an offset portion formed in the backing plate through which air flows to cool the wheel cylinder.

Further features of the device disclosed, include the arrangement of the offset portion in such a manner that it may serve as an anchor for the brake friction means, the provision of a scoop by which more efficient flow of air is obtained, the provision of a new and improved type of connector for the shoes of the friction element, and the arrangement of fixed and floating wheel cylinders within the recess formed by the offset portion in the backing plate.

Further objects and features of the invention will be apparent after a reading of the subjoined specification and claims and after a consideration of the accompanying drawings, in which:

Figure 1 is a view in section taken through a brake drum and disclosing one arrangement constructed according to my invention;

Figure 2 is a sectional view taken substantially on the line 2—2 of Figure 1;

Figure 3 is a fragmentary sectional view taken substantially on the line 3—3 of Figure 1;

Figure 4 is a view corresponding to Figure 1 showing a different form of brake constructed according to my invention;

Figure 5 is a fragmentary view in section taken substantially along the line 5—5 of Figure 4;

Figure 6 is a fragmentary sectional view taken substantially on the line 6—6 of Figure 4;

Figure 7 is a view corresponding to Figures 1 and 4 and showing another brake constructed according to my invention;

Figure 8 is a fragmentary sectional view taken substantially along the line 8—8 of Figure 7; and Figure 9 is a fragmentary sectional view taken substantially on the line 9—9 of Figure 7.

Referring in detail to the drawings, it may be seen that I have shown in Figures 1, 2 and 3 a brake comprising a backing plate 10, brake shoes 12 and 14, and a hydraulic actuating cylinder 16. As may be seen most clearly in Figures 2 and 3, the backing plate 10 is formed with an offset portion 18 forming a recess 18ª in which the actuating cylinder 16 is positioned. The actuating cylinder 16 is secured to the backing plate by any suitable means such as by a stud 20 and nut 22. The cylinder is formed with an inlet port 24 and with a bleed port 26, and is provided with pistons 28. The pistons 28 are arranged to actuate piston rods 30, which extend through openings in the portion 18 and contact with the ends of the shoes 12 and 14. Interposed between the opposite ends of the shoes is a novel type of adjustable connector or strut 32, which will be explained more in detail subsequently. Cooperating with the strut 32 is a spring 34 which urges the ends of the shoes toward each other and holds them in contact with the strut. Adjacent the ends of the portions 18, the backing plate 10 is provided with anchors 36 and 38 which extend through pear-shaped openings 40 and 42 in the ends of the shoes 12 and 14 respectively. Adjacent to the openings 40 and 42 the shoes are provided with relatively small openings 44 and 46, to which are connected the ends of a return spring 48. Secured to the backing plate 10 just beneath the portion 18 (see Figure 3) is a guide 50, which cooperates with the under side of the recess 48.

In the operation of this form of my invention, fluid under pressure supplied through the opening 24 causes a separation of the pistons 28 and through the piston rods 30 spreads the shoes 12 and 14 to contact with the rotating drum 11. If the drum is rotating in a counterclockwise direction, the shoe 14 becomes the primary shoe and through the strut link 32 applies the shoe 12 to the drum and both shoes anchor through the shoe 12 to the anchor 36. Likewise, if the drum is rotating in a clockwise direction, both shoes anchor through the shoe 14 on the anchor 38. When the pressure in the fluid is relieved, the return spring 48 draws the shoes back into position shown. Wear of the shoes may be compensated by the strut 32. It is to be especially noted that the actuating cylinder 16 is separated from the drum 11 and the shoes 12 and 14 by the backing plate 10 and is thus insulated to a certain extent from the heat generated by the friction between the shoes and the drum. Thus the liquid in the actuating cylinder is protected to a large extent from the heat generated in braking. Moreover, inasmuch as the recess 18ª is exposed to the air through which the vehicle is traveling, the air current tends to keep the cylinder 16 and the liquid therein cooled to a normal temperature.

In Figures 4, 5 and 6 there is shown a backing plate 110, a drum 111, shoes 112 and 114, an actuating cylinder 116, an adjusting strut 132, and return springs 134, 148, 149ª and 149ᵇ. The adjusting strut 132 is shown as a pair of threaded sleeves 132ª and 132ᵇ with which there cooperates the screw 132ᶜ having right and left hand threads on opposite ends thereof respectively extending to and cooperating with supplementary threads in the sleeves. The cylinder 116 is formed with one end closed, and the closed end has an extension 160 which is secured as at 162 to the adjacent end of the shoe 112. The cylinder is provided with a piston 128 and associated therewith is a piston rod 130 which extends through the end of the cylinder opposite to the extension 160 and thence into contact with the shoe 114.

The backing plate 110 is provided with an offset member 118 secured to said backing plate by bolts and having a recess 118a in which the cylinder 116 is positioned and the extension 160 and the piston rod 130 extend through openings in the offset portion. The offset portion 118 is formed with a rounded surface at each end and the anchored ends of the shoes are arranged to cooperate with these rounded surfaces so that the offset portion of the backing plate forms the anchor for the shoes.

The operation of the brake shown in Figures 4, 5 and 6 is substantially the same as that shown in Figures 1, 2 and 3. However, in spreading the shoes the cylinder 116 is arranged to float and exerts a thrust on the shoe 112 through the extension 160. The direction of rotation of the drum indicated by the arrow is the normal direction in forward movement of the vehicle, and by reason of the springs 149a and 149b, the shoe 114 moves first into contact with the drum. The shoe 112 in forward braking normally remains in contact with the offset portion and anchors thereon. In reverse braking, however, the shoe 114 comes back to an anchoring position on the offset portion 118 and then the cylinder 116 moves together with the extension 160 and exerts brake applying force upon the shoe 112.

The arrangement shown in Figures 7, 8 and 9 is quite similar to that shown in Figures 1, 2 and 3. However, instead of a standard backing plate a heavy casting 270 is secured as by bolts 252 to the axle 274, and a light cover plate 276 is in turn secured to the casting 270. The casting 270 is formed with an offset portion 278, which houses the cylinder 216. As shown clearly in Figure 8, this heavy casting also carries the anchors 236 and 238, and by means of the bolts of said anchors the cover plate 276 is secured to the casting. A scoop 280 assures a sufficient flow of air at all times to insure cooling of the cylinder 216. The shoes are arranged to be returned by return springs 234 and 235.

The construction of the strut 232, which corresponds exactly to strut 32 is shown most clearly in Figure 7. Therein it may be seen that the strut member 282 contacting with the shoe 212 is formed with exterior threads and a sleeve member 284 is formed with interior threads cooperating therewith. The sleeve 284 has one end 286 formed cylindrical to cooperate with the third element or member 288 of the strut which contacts with the shoe 214 and which is formed with a bore 290. The members 282 and 288 are prevented from rotation by reason of the slot contacting the shoes 212 and 214. Thus rotation of a wheel 292 secured to the sleeve 284 causes movement of the members 282 and 288 in opposite directions, thus spreading the shoes 212 and 214. The spring 234 is arranged to hold the wheel 292 in any adjusted position. The operation of this form of device is exactly the same as that described above in connection with the forms shown in Figures 1, 2 and 3 and need not be repeated.

It may be thus seen that I have provided an efficient brake especially useful in connection with heavy duty vehicles such as trucks. I have provided arrangements for maintaining the liquid of the wheel cylinders cooled in spite of the heat generated by the friction between the shoes and the drum. I have accomplished this by the use of an offset portion of the backing plate arranged with a recess outside of the backing plate in which the actuating cylinder for the brake is positioned. I have provided means for insuring a flow of cooling air through this recess to cool the cylinder and have shown several embodiments, including a fixed cylinder and a floating cylinder.

It is to be understood that the above described embodiments of my invention are for the purpose of illustration only and various changes may be made therein without departing from the spirit and scope of the invention.

I claim:

1. In a brake, a rotating drum, a backing plate provided with an offset portion having a recess exterior of said backing plate from said drum, an actuating member including a cylinder positioned in said recess, shoes within said drum adapted to be brought into contact therewith and arranged to anchor upon said offset portion, and means extending through the walls of said offset portion and connected with the actuating member for spreading said shoes into contact with said drum.

2. In a brake, a rotating drum, a backing plate provided with an offset portion having rounded ends and having a recess exterior to said backing plate from said drum, an actuating member including a cylinder positioned in said recess, shoes within said drum adapted to be brought into contact therewith and arranged to anchor upon and be positioned by the rounded ends of said offset portion, and means extending through the walls of said offset portion and connected with said actuating member for spreading said shoes into contact with said drum.

3. In a brake, a rotating drum, a backing plate provided with an offset portion having a recess exterior of said backing plate from said drum, an actuating member including a cylinder positioned in said recess and unrestrained so that it is allowed to float within said recess, shoes within said drum adapted to be brought into contact therewith, and means extending through the walls of said offset portion and connected with said actuating member for spreading said shoes into contact with said drum.

4. In a brake, a rotating drum, a backing plate provided with an offset portion having a recess exterior of said backing plate from said drum, shoes within said drum adapted to be brought into contact therewith, an actuating member including an actuating cylinder secured to one of said shoes and a piston in said cylinder, a piston rod connected to said piston and to the other of said shoes, and means extending through the walls of said offset portion and connected with said actuating member for spreading said shoes into contact with said drum.

LUDGER E. LA BRIE.